No. 739,869. PATENTED SEPT. 29, 1903.
J. HENRY.
PNEUMATIC STACKER.
APPLICATION FILED DEC. 22, 1902.
NO MODEL. 2 SHEETS—SHEET 2.
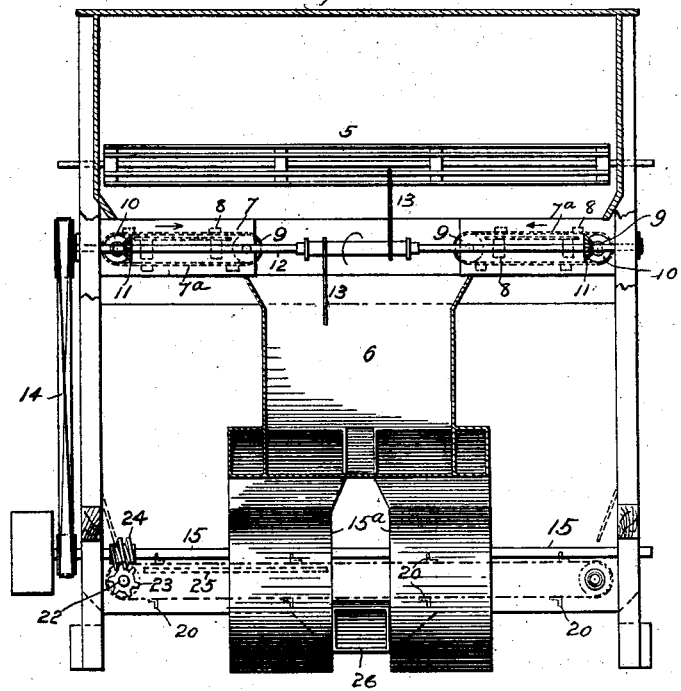
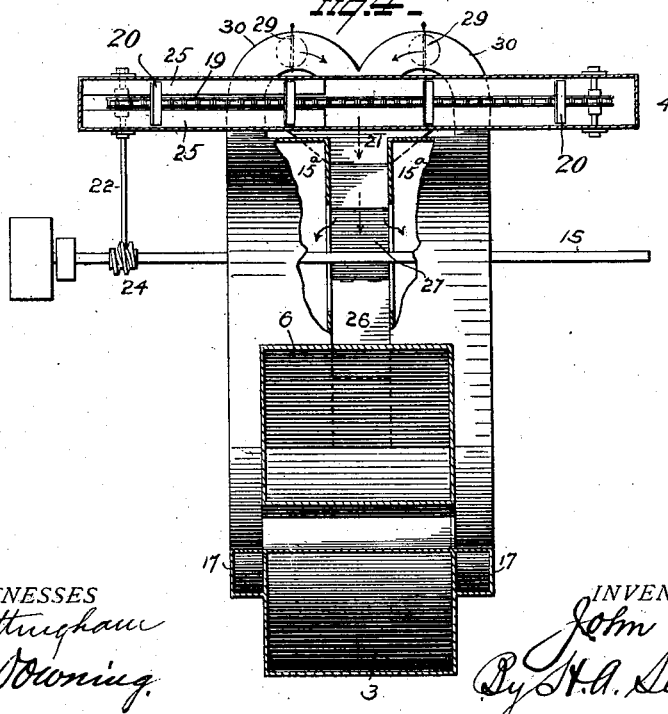
WITNESSES
E. L. Nottingham
G. F. Downing
INVENTOR
John Henry
By H. A. Seymour
Attorney No. 739,869. Patented September 29, 1903.

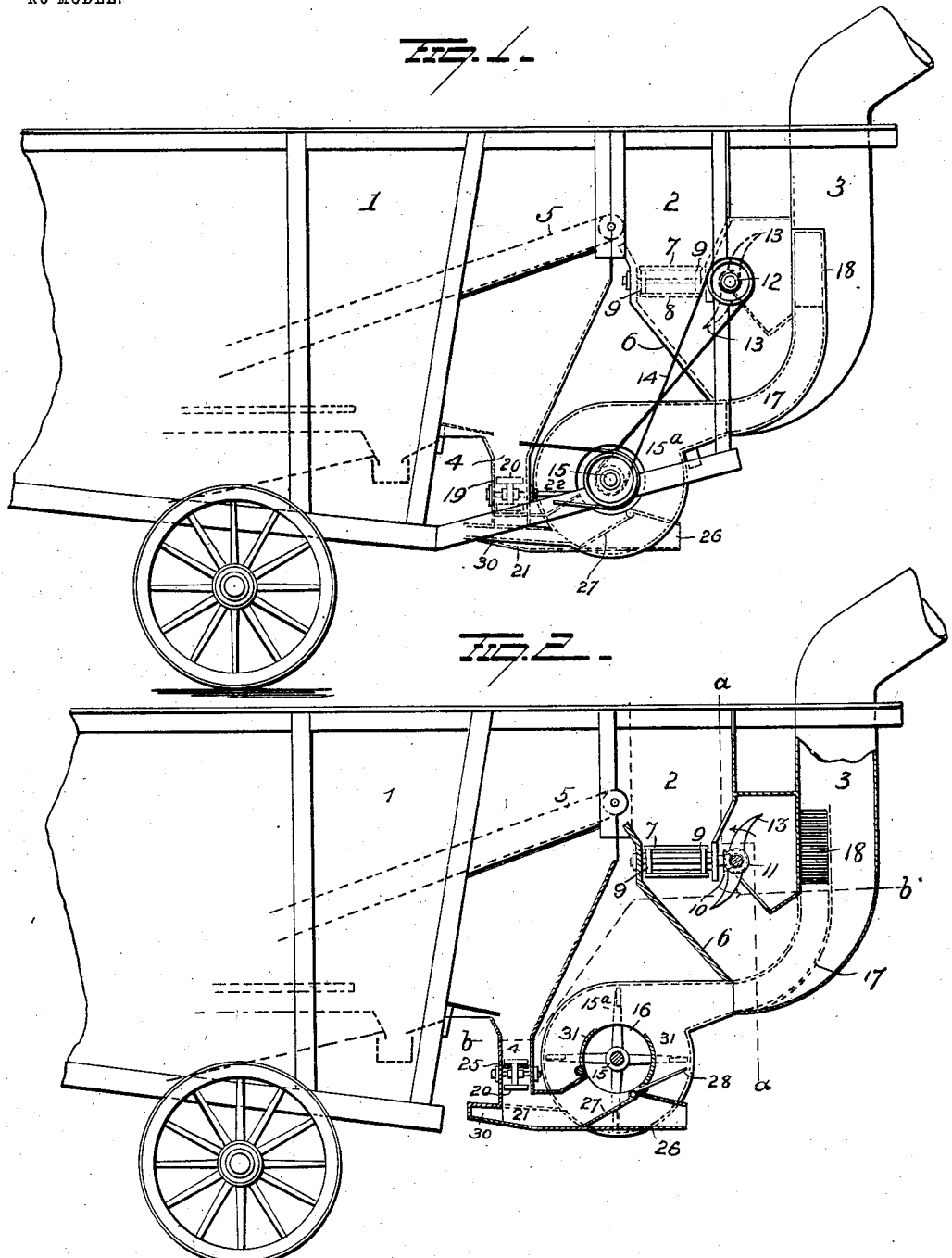

UNITED STATES PATENT OFFICE.

JOHN HENRY, OF GRAND FORKS, NORTH DAKOTA.

PNEUMATIC STACKER.

SPECIFICATION forming part of Letters Patent No. 739,869, dated September 29, 1903.

Application filed December 22, 1902. Serial No. 136,270. (No model.)

*To all whom it may concern:*

Be it known that I, JOHN HENRY, of Grand Forks, in the county of Grand Forks and State of North Dakota, have invented certain new and useful Improvements in Pneumatic Stackers; and I do hereby declare the following to be a full, clear, and exact description of the invention, such as will enable others skilled in the art to which it appertains to make and use the same.

My invention relates to an improvement in pneumatic stackers for threshing-machines, the object being to provide simple and effective means that can be attached to any ordinary threshing-machine for discharging the straw and chaff either together or separately; and it consists in the parts and combinations of parts, as will be more fully described, and pointed out in the claims.

In the accompanying drawings, Figure 1 is a view in side elevation of the rear end of a threshing-machine, showing my improvement applied thereto. Fig. 2 is a similar view showing the attachment or improvement in central vertical section. Fig. 3 is a transverse vertical sectional view on the line $a\ a$ of Fig. 2, and Fig. 4 is a view in section on the line $b\ b$ of Fig. 2.

1 represents a threshing-machine of any approved form provided at its rear end with my improved attachment. This attachment comprises a hopper discharging into the chute or trunk 3, a hopper or receptacle 4 for the chaff, a fan or fans $15^a$, and gearing for actuating the movable parts.

The hopper 2 is secured to the rear end of the thresher-frame 1, and the front end of the same from a point below the conveyer or separator 5 is open, so that the straw carried by the separator or conveyer 5 will be deposited directly into the hopper 2. This hopper is as wide as the thresher-frame at the point of its attachment to the thresher-frame and is provided centrally with a depending boot 6, through which all the straw discharged from the conveyer 5 passes. Some of the straw as it leaves the conveyer falls directly through into the boot 6, while that at the sides falls onto conveyers. These conveyers are preferably in the form of endless belts 7, carrying slats 8, each belt being mounted on drums or shafts 9. The outer drum of each pair of shafts 9 is provided with a bevel-pinion 10, which engage pinions 11 on transverse shaft 12. This shaft 12 is located adjacent to the rear walls of the hopper 2 and boot 6 and is provided centrally with the blades or arms 13, which latter operate as the shaft is rotated to engage the straw and force it down into the boot. These arms also operate to loosen up the straw and distribute it in such condition that it will be most advantageously acted upon by the wind-blast. Shaft 12 is actuated by belt 14, leading to shaft 15, the latter being actuated by a belt leading to a driven pulley on the thresher.

From the above it will be seen that the straw is discharged into the hopper 2, part passing through, while that at the sides falls onto the conveyers 7 $7^a$ and is carried by the latter toward the center and discharged through the open bottom into the boot. The lower end of this boot 6 is in open communication with the chute or trunk 3. Hence the passage of the straw through the boot is assisted by the suction of the air-blast from the fans or blowers $15^a$. The lower end of the chute or trunk 3 at its juncture with the boot 6 is curved, as shown, so as to provide an easy unobstructed path for the straw, and the fans or blowers $15^a$ are located below the boot and in advance of the chute or trunk in a position to discharge their blasts into the lower end of the chute or trunk at the juncture of the latter and the boot. The fan-casings are separated slightly, as shown in Fig. 3, and both fans are actuated by the shaft 15, previously referred to, and each casing is provided in its inner wall with an opening 16, through which the air enters the casings. The discharge end of both fan-casings communicate with the chute or trunk 3, as previously described, and project laterally beyond said chute or trunk, as shown in Figs. 3 and 4, the projecting portions of said discharge ends communicating with the auxiliary blast-pipes 17, which project upwardly alongside of the chute or trunk 3 and discharge into the latter at a point 18 above open lower end of the boot, thus producing a suction in the boot, which assists the blast in starting the straw up the chute or stack and also assists the main blast after the straw passes the openings 18. The chute or stack is preferably angular at its base, but may be gradually converted into cylindrical shape above the base, the shape, however, being immaterial.

The chaff separated from the grain and straw is discharged into the receptacle 4. This hopper or receptacle 4 extends transversely across the machine in front of the fans and is provided with a conveyer 19, comprising a chain, belt, or other flexible device carrying a series of slats or scrapers 20, which latter operate to convey the chaff toward the center and discharge it into a pocket which is in open communication with the hopper or receptacle 4. The chain or other flexible device 19 of the conveyer is mounted on pulleys or wheels near the ends of hopper 4, and motion is imparted thereto through shaft 22, carrying one of the conveyer-pulleys and also a worm-wheel 23, which meshes with worm 24 on shaft 15.

Located within the hopper 4, to one side of the pocket 21, is the false bottom 25, which latter rests in a plane just below the top of the conveyer, so that the chaff falling on that side of the hopper settles on the false bottom and is swept by the slats toward and into pocket 21, while the chaff at the other side of the pocket falls onto the main bottom of the hopper 4 and is carried by the slats and deposited into the central pocket 21. The chaff thus deposited into the pocket 21 is withdrawn by suction or air-blast and may be discharged through the fans into the spout with the straw or may be discharged into a separate pile. Leading rearwardly from the pocket 21 is the spout 26, the discharge end of which is shown as terminating just in rear of the fan-casings 15ᵃ, but which may be continued rearwardly or laterally to either side, as may be desired. This spout is between the fan-casings and is provided in its upper side with a hinged section 27, which latter may be dropped, as shown in Fig. 2, so as to direct the chaff into the fan-casings, or may be raised by handle 28 to close the opening leading to the fan-casings, and thus cause the chaff to pass out through the discharge end of spout 26. When it is desired to discharge the chaff with the straw, the hinged section 27 is dropped to the position shown in Fig. 2, and the suction of the fans draws the chaff from pocket 21 through spout 26 into the fan-casings and out of the latter into the chute or trunk 3. When it is desired to separate the chaff from the straw, the section 27 is raised, so as to cut off communication between spout 26 and the fan-casings, and the valves 29 in pipes 30 are opened. These pipes connect with the peripheries of the fan-casings, and consequently receive blasts which entering the pocket 21 from the front drive the chaff out through spout 26.

In order to insure suction sufficient to withdraw the chaff, I prefer to partly inclose the adjacent openings 16 in the fan-casings by the curved shields 31, which latter extend from one casing to the other and are pivoted to both, so that they may be adjusted toward and away from the openings 16. These shields are at opposite ends of the hinged section 27 of spout 26, so that when the section 27 is lowered to open communication between spout 26 and the fan-casings the greater part of the air drawn into the fan-casings must come through spout 26.

It is evident that changes in the construction and relative arrangement of the several parts might be made without avoiding my invention, and hence I would have it understood that I do not restrict myself to the particular construction and arrangement of parts shown and described; but, Having fully described my invention, what I claim as new, and desire to secure by Letters Patent, is—

1. In a pneumatic stacker, the combination with a chaff-receptacle, a pocket communicating therewith, and means for discharging chaff into said pocket, of pneumatic devices communicating with said pocket for removing chaff from said pocket and discharging it, and a discharge-outlet for said pocket independent of said pneumatic devices.

2. In a pneumatic stacker, the combination with a hopper for the straw, a hopper for the chaff and a chute or trunk, of a fan connected with the chute or trunk and having blast and suction connection with the chaff-receptacle.

3. In a pneumatic stacker, the combination with a hopper for the straw, a hopper for the chaff, conveyers in said hoppers and a chute or trunk, of a fan connected with the chute or trunk, a spout leading from the chaff-hopper and a fan having a suction and blast connection with the chaff-hopper.

4. In a pneumatic stacker, the combination with a hopper for the straw, a hopper for the chaff and a chute or trunk having a connection with both hoppers, of a fan connected with both hoppers and having a blast and suction connection with the chaff-hopper.

5. In a pneumatic stacker, the combination with a hopper for the straw, a conveyor therein and a boot below and to one side the conveyer, of a chute or trunk leading from the lower end of the boot and a fan-casing discharging into the lower end of the chute or trunk.

6. In a pneumatic stacker, the combination with a hopper for the straw, a conveyer within said hopper and boot depending from one side of the conveyer, of a chute or trunk leading from the lower end of the boot, and a fan-casing discharging into the chute or trunk below the boot-opening and also above the latter.

7. In a pneumatic stacker, the combination with a hopper for the straw, a boot leading from said hopper, and a pair of conveyers on opposite sides of the boot-opening in the hopper, of a chute or trunk leading from the lower end of the boot and a fan discharging into said chute or trunk.

8. The combination with a hopper for the chaff and a pocket communicating with said hopper, of a fan having blast and suction connection with said pocket.

9. The combination with a hopper for chaff, a pocket below said hopper and a pair of fans, of a spout leading from the pocket and blast and suction connection between said fans and pocket.

10. The combination with a hopper for chaff, a conveyer in said hopper and a pocket below the hopper into which the chaff is deposited by the conveyer, of a fan having a blast connection with said pocket.

11. The combination with a hopper for chaff, a conveyer in said hopper and a pocket below the hopper into which the chaff is deposited by the conveyer, of a fan having a suction connection with the pocket.

In testimony whereof I have signed this specification in the presence of two subscribing witnesses.

JOHN HENRY.

Witnesses:
A. W. BRIGHT,
S. G. NOTTINGHAM.